No. 692,056. Patented Jan. 28, 1902.

A. S. KROTZ.
RUBBER TIRE.
(Application filed Apr. 29, 1901.)

(No Model.)

WITNESSES:
F. Llewellyn Walker
Percy Norton

INVENTOR.
Alvaro S. Krotz
BY
ATTORNEY.

UNITED STATES PATENT OFFICE.

ALVARO S. KROTZ, OF SPRINGFIELD, OHIO, ASSIGNOR TO CONSOLIDATED RUBBER TIRE COMPANY, OF JERSEY CITY, NEW JERSEY, A CORPORATION OF NEW JERSEY.

RUBBER TIRE.

SPECIFICATION forming part of Letters Patent No. 692,056, dated January 28, 1902.

Application filed April 29, 1901. Serial No. 58,027. (No model.)

*To all whom it may concern:*

Be it known that I, ALVARO S. KROTZ, a citizen of the United States, residing at Springfield, in the county of Clark and State of Ohio, have invented certain new and useful Improvements in Rubber Tires, of which the following is a specification.

My invention relates to improvements in solid rubber tires for vehicle-wheels, and more especially to tires held in the rim or channel of the wheel by one or more independent retaining wires or bands.

The object of my invention is to provide means for preventing the creeping of the tire and wires and at the same time relieve the tire from wear by the bands or wires. I attain these objects by the constructions shown in the accompanying drawings, in which—

Figure 1:
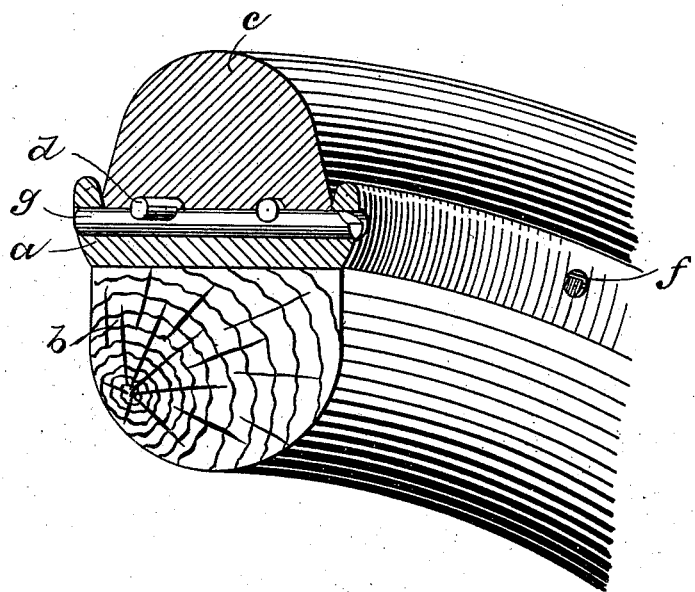
Figure 2:
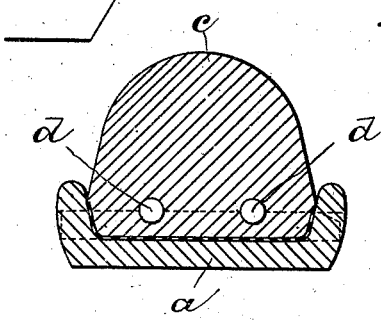
Figure 3:
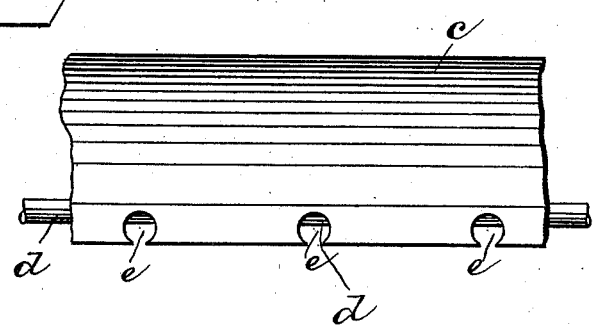
Figure 4:
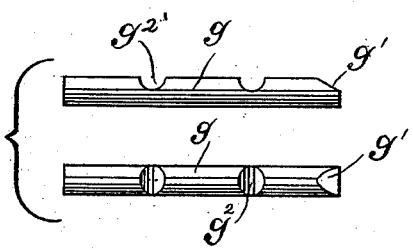

Figure 1 is a sectional elevation of a wheel rim and tire, partly in perspective, embodying my device. Fig. 2 is an end view in section of the same. Fig. 3 is a side view of the tire, and Fig. 4 shows two views of the transverse bars.

Like parts are represented by similar letters of reference in the several views.

In constructing my device I employ the metallic channel $a$, attached to the wooden felly $b$ of the wheel. Within the channel $a$ I place the rubber tire $c$, preferably formed in a single piece, but may be continuous. The wires $d$ extend through the tire and are united at their ends, forming independent retaining-wires. The tire is transversely perforated at intervals, as shown at $e$, and the flanges of the channel are likewise perforated at $f$ to correspond with the perforations of the tire. Said transverse perforations through the tire and channel are so located that they partially intersect the lower portions of the retaining-wires $d$, so that when the transverse bars $g$ are driven in place the beveled end $g'$ will contact with and lift the wires, the elasticity of the tire permitting this, until the wires engage the notches $g^2$ of the bars.

It will be seen that the transverse bars prevent any possible creeping of the tire, and in the event of the wires creeping this will be prevented by the joints of the wires coming in contact with the transverse bars. Furthermore, the independent retaining-wires engaging the transverse bars, the tire is relieved of wear between the wires and the channel, and, further, by reason of the wires engaging the notches of the bars the bars are held in place.

While the wires are shown as fully resting in the notches $g^2$ of the transverse bars, it is obvious that by making the notches deeper and so assembling the parts that the wires, while engaging, will not rest on the bottom of the notches the retaining-wires will more firmly bind the tire. Although two wires are shown in the drawings, it is obvious that my device may be used with one or more, and, further, that bands may be used instead of wires, the notches in the bars being made to conform with the bands.

Having thus described my invention, I claim—

1. In a rubber tire for vehicle-wheels, the combination with the channel, the tire and independent retaining-wires, of bars extending transversely at intervals through said tire and channel and partially intersecting said wires; substantially as and for the purpose specified.

2. In a rubber tire for vehicle-wheels, the combination with the channel, the tire and independent retaining-wires, of bars extending transversely at intervals through said tire and channel, and partially intersecting said wires; said bars being beveled at one end and having notches in one side thereof to engage said wires when said bars are driven in place, substantially as specified.

3. In a rubber tire for vehicle-wheels, the combination with the channel, the tire and independent retaining-wires, of bars extending transversely at intervals through said tire and channel and intersecting the under side of said wires; said bars being beveled at one end and having notches in the upper side thereof to correspond with and receive said wires when said bars are driven in place, substantially as specified.

4. In a rubber-tire machine, the combination with the channel, the tire and independent retaining-wires, of bars extending transversely at intervals through the base of said tire and the flanges of said channel and contacting the seat in said channel and intersecting the under side of said wires; said bars being beveled at one end and having notches in the upper side thereof to correspond with and receive said wires when said bars are driven in place, substantially as specified.

In testimony whereof I have hereunto set my hand this 24th day of April, A. D. 1901.

ALVARO S. KROTZ.

Witnesses:
PERCY NORTON,
CHAS. I. WELCH.